United States Patent Office
3,531,488
Patented Sept. 29, 1970

3,531,488
DISULPHONAMIDES
Hartmund Wollweber, Wuppertal-Elberfeld, Harald Horstmann, Wuppertal-Vohwinkel, and Karl Meng, Wuppertal-Elberfeld, Germany, assignors to Farbenfabriken Bayer Aktiengesellschaft, Leverkusen, Germany, a corporation of Germany
No Drawing. Filed May 5, 1967, Ser. No. 636,269
Claims priority, application Germany, May 12, 1966,
F 49,189
Int. Cl. C07d 27/08
U.S. Cl. 260—293.4        12 Claims

ABSTRACT OF THE DISCLOSURE

Disulphonamides of the formula:

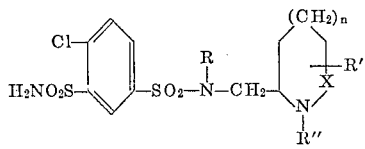

wherein

R is hydrogen or methyl,
R' is hydrogen or lower alkyl,
R'' is hydrogen, lower alkyl, alkoxyalkyl, aryl or aralkyl,
X is $CH_2$ or CO and
n is 0 or 1 and their pharmaceutically acceptable non-toxic salts are produced by reacting 4-chloro-3-sulphonamido-benzene-sulphochloride of the formula:

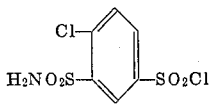

with an amine or salt thereof of the formula:

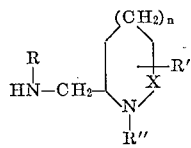

wherein R, R', R'', X and n have the above meanings.
Disulphonamides of the formula:

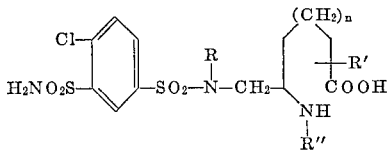

and their pharmaceutically acceptable non-toxic salts are produced by reacting the 4-chloro-3-sulphonamido-benzene-sulphochloride of compound (I) with an amine of the formula:

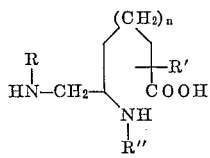

wherein R, R', R'' and n are as defined above.

These disulphonamides are useful as saluretics and salts of the disulphonamides with organic non-toxic acids and bases may be used for parenteral administration in an aqueous solution in which solubilizers are not necessary.

The present invention is concerned with disulphonamides of the formula:

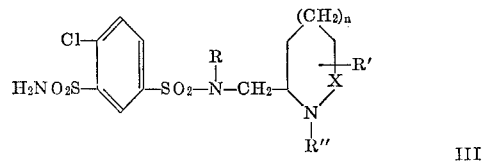

wherein:

R is hydrogen or methyl,
R' is hydrogen or lower alkyl,
R'' is hydrogen, lower alkyl, alkoxyalkyl, aryl or aralkyl,
X is $CH_2$ or CO and
n is 0 or 1 and their pharmaceutically acceptable non-toxic salts and a method for production of such compounds.

It has also been discovered that ring-opened amino-carboxylic acid derivatives of the Formula V are useful as saluretics, particularly in the form of salts:

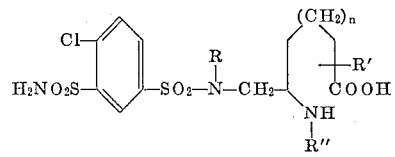

wherein R, R', R'' and n are as defined above.

It has been discovered that replacement of the pyrrolidone ring i.e., when n=0, with a piperidine ring i.e., when n=1 produces useful compounds according to the present invention. Such compounds have the general formula:

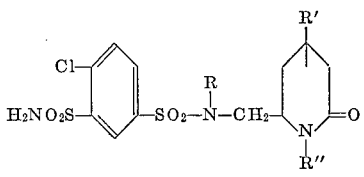

wherein R, R' and R'' are as defined above.

It is known in the art that 2,4-disulphamyl-chlorobenzenes of the formula:

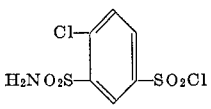

have a saluretic or salt-purging effect [cf. Jakob, Dtsch. Med. Wschr. 85, 814 (1960)]. It is also known that certain derivatives of 2,4-disulphamyl-chlorobenzene in which the sulphamyl radical in the p-position to the chlorine atom is mono- or di-substituted are superior to the unsubstituted 2,4-disulphamylchlorobenzene set forth above with respect to saluretic effects. (cf. Belgian patent specification No. 598,722; German patent specification No. 1,096,897; German patent specification No. 1,111,618).

By comparison with the effectiveness of commercial diuretics of the sulphonamide series, such as hydrochlorothiazide [U.S. Pat. No. 2,809,194; Experientia 14, 458 (1958)], the effect of the above-mentioned benzene-disulphonamides must be considered only moderate and, therefore, according to the present state of the art, these benzene disulphonamides are of only limited interest in use in clinical practice.

Moreover, all of these compounds have in common the fact that besides the excretion of $Na^+$ and $Cl^-$ ions, $K^+$ ions are simultaneously eliminated in approximately the same amount and to the same extent so that by prolonged usage and especially during prolonged clinical administration, hypopotassaemia may result. For a saluretic to be useful for administration, a Na+/K+ quotient as large as possible is of great importance.

It has now been found that new and novel disulphonamides of the formulae:

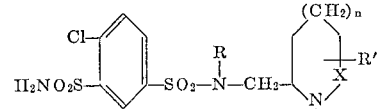

III

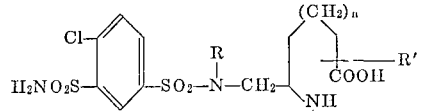

V

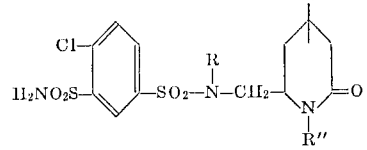

VI wherein R, R', R", X and $n$ are as above defined, are obtained which are significantly more effective with respect to their diuretic and saluretic activity than those compounds of the prior art and, in particular, these new compounds have a much more favorable Na+/K+ quotient so that they are suitable for administration to humans and animals.

The disulphonamides of the formula:

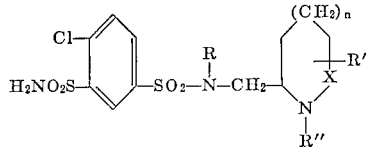

III are produced by reacting 4-chloro-3-sulphonamido-benzene-sulphochloride of the formula:

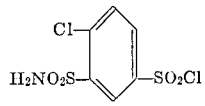

I with an amine or salt thereof of the formula:

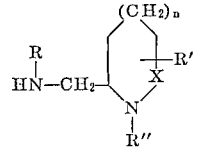

II in which R, R', R", X and $n$ are as defined above. This reaction may take place in either the presence or absence of an acid binding agent.

The amines or their salts of the formula:

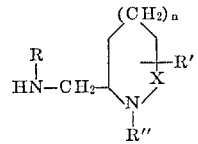

II may also be reacted when X is a carbonyl group, i.e., CO, in the form of their ring-opened aminocarboxylic acids:

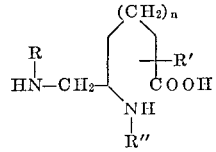

IV with 4-chloro-3-sulphonamido-benzene-sulphochloride, to form:

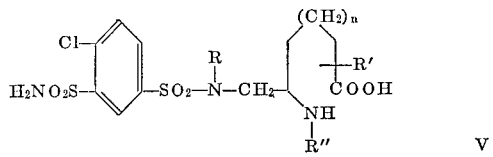

V

The lactam ring may be formed by subsequent heating:

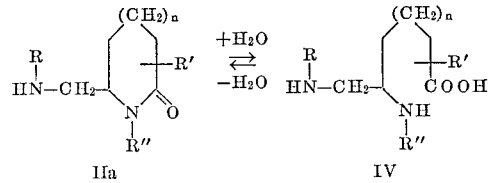

IIa            IV

The disulphonamides of the formula:

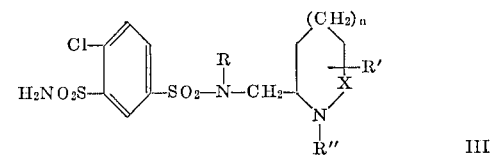

III form salts with organic or inorganic non-toxic bases at the non-substituted sulphonamide group. These salts have a strongly alkaline reaction in aqueous media. The disulphonamides of Formula III also form salts with organic and inorganic non-toxic acids and these salts are soluble in water, producing a neutral or weakly acidic reaction. If in Formula III X is a carbonyl group, i.e., CO, then the salts are derived from the ring-opened corresponding aminocarboxylic acid of the formula:

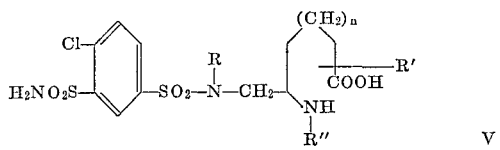

V which, as switter ion, reacts with alkalies as well as with acids to form salts.

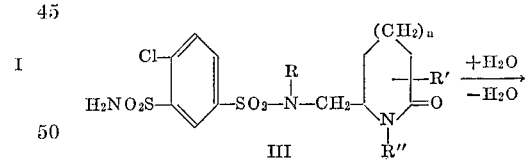

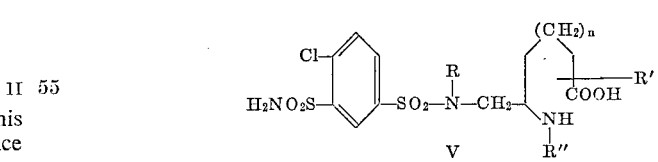

V wherein R, R', R" and $n$ are, of course, as defined above.

The disulphonamides of the formula:

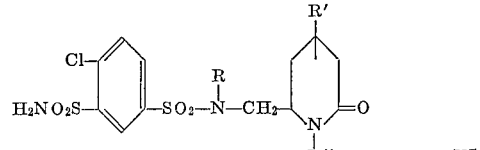

VI are produced by reacting 4-chloro-3-sulphonamido-benzene-sulphochloride of the formula:

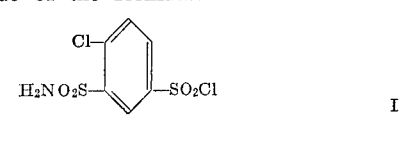

I with an amine or salt thereof of the formula:

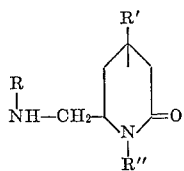

wherein R, R' and R" are as defined above.

The salts of the disulphonamides (III) and (V) with non-toxic organic or inorganic acids and salts with non-toxic organic bases have been found to be particularly suitable for administration as saluretics in aqueous solution by parenteral administration. In contrast to solutions of known diuretics, the addition of further solubilizers of such solutions is not required.

The products according to the invention are suitable for sweeping out edemata of various geneses as well as for the treatment of hypertension. In the treatment of edema the preparations are to be administered in a dosage between 20 to 100 mg. per day. For the therapy of hypertension which should be carried out for a prolonged period of time, a dosage of 10 to 30 mg. per day is sufficient.

The compounds according to the invention are mixed together with a pharmacologically indifferent carrier, e.g. talc, lactose, starch, ethyl cellulose, agar pectine, stearic acid, magnesium stearate, sodium bicarbonate or gelatin.

For parenteral application, suitable compounds wherein X represents a $CH_2$-group, are the salts with non-toxic acids, while suitable compounds wherein X is a carbonyl group, are the salts of non-toxic bases of the open-chain amino-carboxylic acid. These salts allow the preparation of aqueous stable solutions with a pH value between 6 and 8.

The aforesaid solid or liquid preparations can be applied in form of capsules, tablets, pills, powder, granulates or suppositories and ampoules or drops.

The following non-limitative examples illustrate the production of typical compounds according to the present invention:

EXAMPLE 1

4 - chloro - 3 - sulphonamido - 1-[N-methyl-N-(N,α-dimethyl - α - pyrrolidonyl - methyl)] - benzene-sulphonamide 3.5 grams α-methylaminomethyl-α-dimethyl-pyrrolidone are added to 50 ml. acetone and mixed with 3.6 g. 4 - chloro-3-sulphonamido-benzene-sulphochloride-(1) while stirring. The reaction mixture is heated at boiling temperature for 30 minutes, the solvent is driven off, the product taken up with water and neutralized.

It is purified by recrystallization from 20% glacial acetic acid.

The yield is 73%, referred to sulphochloride used; M.P. 174 to 176° C.

The α - methylaminomethyl-α,N-dimethyl-pyrrolidone of boiling point 90 to 94° C./0.5 mm./Hg. starting material is prepared by the reaction of α-aminomethyl-N,α-dimethyl-pyrrolidone with benzaldehyde, followed by alkylation with dimethyl sulphate and hydrolysis of the quaternary Schiff's base.

EXAMPLE 2

4 - chloro - 3-sulphonamido-1-[N-(α,N'-dimethyl-α-pyrrolidonyl-methyl)]-benzene-sulphonamide 14.2 grams α,N-dimethyl-α-aminomethyl-pyrrolidone are dissolved in 100 ml. acetone. 14.5 grams 4-chloro-3-benzene-sulphonamido-benzene-sulphochloride - (1) are introduced into the mixture which is heated at boiling temperature for 15 minutes. The solvent is driven off, the residue mixed with 100 ml. water and neutralized.

After some days the initially oily reaction product crystallizes and is then obtained in the pure state by recrystallization from 30% glacial acetic acid.

The crystallization of the crude product can be substantially accelerated by seeding with a crystalline compound.

The yield is 78% of theory; M.P. 215 to 217° C.

The α,N-dimethyl-α-aminomethyl-pyrrolidone of B.P. 102 to 104° C./0.4 mm./Hg is obtained by hydrogenation of α-cyano-N,α-dimethyl-pyrrolidone in alcohol with Raney nickel as catalyst.

In an analogous manner there were obtained: 4-chloro-3 - sulphonamido - 1-[N-(N'-ethyl-α-methyl-α-pyrrolidonyl-methyl)]-benzene-sulphonamide M.P. 213 to 214° C.; yield 68% of theory.

Starting material: N - ethyl-α-methyl-α-aminomethyl-pyrrolidone of B.P. 108 to 110° C./0.7 mm. Hg.

In an analogous manner there were obtained: 4-chloro-3-sulphonamido-1-(N-[N' - (β - phenethyl) - α - methyl-α - pyrrolidonyl - methyl]) - benzene - sulphonamide of M.P. 68 to 73° C.; yield 46% of theory.

Starting material: α-aminoethyl-α-methyl-N-(β-phenyl-ethyl)-pyrrolidone of B.P. 180 to 184° C./0.5 mm. Hg is obtained by hydrogenation of α-cyano-α-methyl-N-(β-phenylethyl)-pyrrolidone of B.P. 150 to 154° C./0.7 mm. Hg, which is prepared by heating laevulinic acid ethyl ester cyanohydrin with β-phenyl-ethylamine in alcohol to 125° C.

In an analogous manner there were obtained: 4-chloro-3-sulphonamido-1-[N-methyl-N-(α - methyl - α - pyrrolidonylmethyl)]-benzene-sulphonamide of the formula:

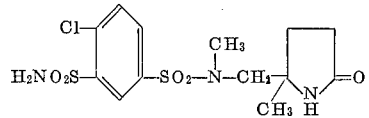

M.P. 210 to 211° C.; yield 68% of theory.
IR: lactam bands at 1670 cm.$^{-1}$.

Starting material: α-N-dimethyl-α-aminomethyl-pyrrolidone is reacted with benzaldehyde and thereafter quaternized with dimethyl sulphate. The hydrolysis of the quaternary Schiff's base gives the α-N-dimethyl-α-methyl-aminomethyl-pyrrolidone, B.P. 92 to 94° C./0.4 mm. Hg.

In an analogous manner, there were obtained: 4-chloro-3 - sulphonamido - 1-[N-methyl-N-(N'-ethyl-α-methyl-α-pyrrolidonyl-methyl)]benzene-sulphonamide of the formula.

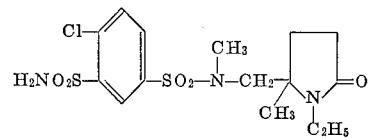

M.P. 192 to 193° C.; yield 32% of theory.
IR: lactam bands at 1650 cm.$^{-1}$.

Starting material: N-ethyl-α-methyl-α-aminomethyl-pyrrolidone is monomethylated by use of benzaldehyde, dimethyl sulphate and following hydrolysis to obtain the N-ethyl-α-methyl-α-methylaminomethyl - pyrrolidone of B.P. 80 to 84° C./0.3 mm. Hg.

4 - chloro-3-sulphonamido-[N-methyl-N-(N'-benzyl-α-methyl-α-pyrrolidonylmethyl)]benzene - sulphonamide of the formula

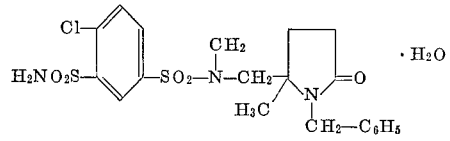

M.P. 54 to 58° C. (decomposition).
IR: lactam bands at 1660 cm.$^{-1}$.

Starting material: laevulinic acid ethyl ester cyanohydrin is reacted with benzylamine to form α-cyano-N-benzyl-α-methyl-pyrrolidone, B.P. 156° C./0.4 mm. Hg, and then hydrogenated to form α-aminomethyl-N-benzyl-α-methyl-pyrrolidone, B.P. 148 to 152° C./0.35 mm. Hg.

N-benzyl-α-methyl-α-methylaminomethyl - pyrrolidone of B.P. 160 to 162° C./0.5 mm. Hg is obtained by the subsequent successive action of benzaldehyde, dimethyl sulphate and hydrolysis.

4 - chloro - 3 - sulphonamido - 1 - {N-methyl-N-[N'-(2-methoxyethyl)-α-methyl-α - pyrrolidonyl - methyl]}-benzene-sulphonamide of the formula:

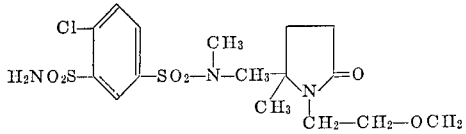

The compound crystallizes with one mol. of water. M.P. 100 to 102° C.; yield 72% of theory.
IR: lactam bands at 1648 cm.$^{-1}$.

Starting material: laevulinic acid ethyl ester cyanohydrin is reacted with p-methoxy-ethylamine to the α-cyano-N-(β-methoxy-ethyl)-α-methyl-pyrrolidone of B.P. 130 to 134° C./0.5 mm. Hg, and then hydrogenated to the α-aminomethyl-N-(β-methoxy-ethyl)-α-methyl-pyrrolidone of B.P. 134 to 138° C./0.7 mm. Hg. Thereafter the N - (β - methoxy - ethyl)-α-methyl-α-methylaminomethyl-pyrrolidone of B.P. 93 to 96° C./0.3 mm. Hg is obtained by successive action of benzaldehyde, dimethyl sulphate and hydrolysis.

In an analogous manner there was obtained: 4-chloro-3 - sulphonamido - 1 - [N - (6',N'-dimethyl-6'-piperidone-(2')-ylmethyl)]-benzene-sulphonamide of the formula:

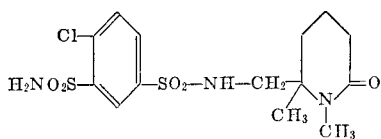

M.P. 199 to 201° C.; yield 71% of theory.

The 6-N-dimethyl-6-aminomethyl-ppieridone-(2) of B.P. 112 to 114° C./0.35 mm. Hg, used as starting material, is obtained by reduction of 6-cyano-6-N-dimethyl-piperidone-(2, B.P. 100 to 103° C./0.35 mm. Hg, in alcohol with Raney nickel as catalyst, the latter compound being prepared by the reaction of 4-acetyl-butyric acid ethyl ester with hydrocyanic acid to the 4-acetyl-butyric ethyl ester cyanohydrin and following condensation with methylamine at 120 to 140° C.

EXAMPLE 3

4 - chloro - 3 - sulphonamido-1-[N-methyl-N-(N'-methyl-α-pyrrolidinyl-methyl)]-benzene-sulphonamide 6.4 grams N-methyl-(α-methylaminomethyl)-pyrrolidine are dissolved in 100 ml. dry acetone and the mixture is then treated with 6.9 g potassium carbonate. 14.5 grams 4-chloro-3-sulphonamido-benzene-sulphochloride-(1) are introduced, while stirring and cooling with ice water. The reaction mixture is stirred at room temperature for one hour, then heated at boiling temperature for one hour, the inorganic salts are filtered off with suction, the mixture is concentrated by evaporation, the product mixed with water and neutralized. The oily product is dissolved in chloroform, extracted with dilute hydrochloric acid and isolated by neutralization of the aqueous phase. The compound is recrystallized from 50% ethanol and melts at 111° to 115° C. The yield is 67% of theory.

The N-methyl-(α-methylaminomethyl)-pyrrolidine of B.P. 54° C./12 mm Hg is obtained by the reaction of N-methyl-3-chloropiperidine with monomethylamine at 150° C.

In an analogous manner there was obtained: 4-chloro-3-sulphonamido-1-[N-methyl-N-(N',α-dimethyl-α-pyrrolidinylmethyl)]-benzene-sulphonamide.

Yield: 69% of theory; melting point 110° C.

The hydrochloric obtained in quantitative yield with hydrochloric acid in ethanol is soluble in water having an almost neutral reaction, stable when exposed to air and melts at 237 to 239° C.

Starting material: N,α-dimethyl-α-methylaminomethyl-pyrrolidine of B.P. 110° C./100 mm. Hg is obtained by the reduction of α-formylaminomethyl-N,α-dimethyl-pyrrolidone (M.P. 60 to 62° C.) with lithium aluminum hydride, the latter compound being prepared by the reaction of formic acid ethyl ester with α-methyl-aminomethyl-N,α-dimethyl-pyrrolidone.

EXAMPLE 4

50 grams 4 - chloro - 3 - sulphonamido-1[N-methyl-N-(N',α - dimethyl - α - pyrrolidonyl - methyl)] - benzene - sulphonamide, 7 g. sodium bicarbonate and 2.5 g. magnesium stearate are ground and filled into gelatin capsules in portions of 0.05 g. each.

EXAMPLE 5

10 grams of the hydrochloride of 4-chloro-3-sulphonamido - 1 - [N - methyl-N-(N',α-dimethyl-α-pyrrolidonyl-methyl)]-benzene-sulphonamide are dissolved in 400 ml. of distilled water. 2 ml. each of the solution are filled into ampoules after sterilization.

What is claimed is:

1. A compound selected from the group consisting of bases of the formula:

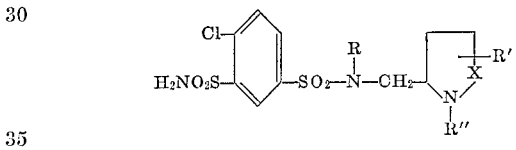

wherein:
R is hydrogen or methyl,
R' is hydrogen or lower alkyl,
R'' is hydrogen, lower alkyl, 2-methoxy ethyl, benzyl or phenethyl,
X is CH$_2$ or CO and pharmaceutically acceptable, non-toxic salts thereof.

2. A compound selected from the group consisting of bases of the formula:

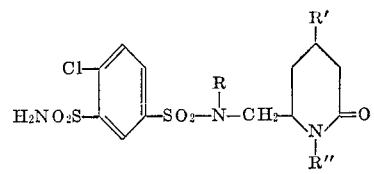

wherein:
R is hydrogen or methyl,
R' is hydrogen or lower alkyl,
R'' is hydrogen, lower alkyl, 2-methoxy ethyl, benzyl or phenethyl, and pharmaceutically acceptable, non-toxic salts thereof.

3. Compound of claim 1 which is 4-chloro-3-sulphonamidol - 1 - [N-methyl - N - (N,α-dimethyl-α-pyrrolidonyl-methyl)]-benzene-sulphonamide.

4. Compound of claim 1 which is 4-chloro-3-sulphonamido - 1 - [N,α,N' - dimethyl - α - pyrrolidonyl-methyl)]-benzene-sulphonamide.

5. Compound of claim 1 which is 4-chloro - 3 - sulphonamido- 1 -[N - (N' - ethyl-α-methyl-α-pyrrolidonyl-methyl)]-benzene-sulphonamide.

6. Compound of claim 1 which is 4-chloro-3-sulphonamido - 1 - (N-[N'-β-phenethyl)-α-methyl-α-pyrrolidonyl-methyl])-benzene-sulphonamide.

7. Compound of claim 1 which is 4-chloro-3-sulphonamido - 1 - [N-methyl-N-(α-methyl-α-pyrrolidonyl-methyl)]-benzene-sulphonamide.

8. Compound of claim 1 which is 4-chloro-3-sulphonamido - 1-[N-methyl-N(N'-ethyl-α-methyl-α-pyrrolidonyl-methyl)]benzene-sulphonamide.

9. Compound of claim 1 which is 4-chloro-3-sulphonamido - 1 - (N - methyl-N[N'-(2-methoxy-ethyl)-α-methyl - α - pyrrolidonyl - methyl]) - benzene-sulphonamide.

10. Compound of claim 2 which is 4-chloro-3-sulphonamido - 1 - [N - (6',N'-dimethyl-6'-piperidone-(2')-ylimethyl)]-benzene-sulphonamide.

11. Compound of claim 1 which is 4-chloro-3-sulphonamido -1- [N - methyl-N(N'-methyl-α-pyrrolidinylmethyl)]-benzene-sulphonamide.

12. Compound of claim 1 which is 4-chloro-3-sulphonamido - 1 - [N - methyl-N-(N',α-dimethyl-αpyrrolidinylmethyl]-benzene-sulphonamide.

References Cited
FOREIGN PATENTS 976,532  11/1964  Great Britain.
222,110  7/1962  Germany.

OTHER REFERENCES

J. Pharmacy & Pharmacology, vol. 12, 1960, Boggiano et al., pp. 497–500.

HENRY R. JILES, Primary Examiner
S. D. WINTERS, Assistant Examiner

U.S. Cl. X.R.

260—293, 294.7, 326.5, 326.82, 326.85, 518, 534, 543; 424—267, 274